United States Patent
Shen et al.

(10) Patent No.: US 10,673,247 B2
(45) Date of Patent: Jun. 2, 2020

(54) POWER CONTROL CIRCUIT AND POWER CONTROL METHOD

(71) Applicant: ASUSTeK COMPUTER INC., Taipei (TW)

(72) Inventors: Wen-Chi Shen, Taipei (TW); Wen-Bin Jian, Taipei (TW); Cheng-Jui Chang, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 168 days.

(21) Appl. No.: 15/923,204

(22) Filed: Mar. 16, 2018

(65) Prior Publication Data

US 2018/0278061 A1  Sep. 27, 2018

(30) Foreign Application Priority Data

Mar. 22, 2017 (TW) .............................. 106109590 A

(51) Int. Cl.
*H02J 4/00* (2006.01)
*G06F 1/26* (2006.01)

(52) U.S. Cl.
CPC ................ *H02J 4/00* (2013.01); *G06F 1/263* (2013.01)

(58) Field of Classification Search
CPC .................................. H02J 4/00; G06F 1/263
See application file for complete search history.

(56) References Cited

U.S. PATENT DOCUMENTS

| 2009/0073130 A1* | 3/2009 | Weber ................. G06F 3/03547 345/173 |
| 2014/0237271 A1* | 8/2014 | Takase .................... G06F 1/263 713/300 |
| 2018/0260545 A1* | 9/2018 | Chen ...................... G06F 3/0488 |

FOREIGN PATENT DOCUMENTS

| CN | 201196750 Y | 2/2009 |
| CN | 102760216 A | 10/2012 |
| TW | 201228518 A1 | 7/2012 |

* cited by examiner

*Primary Examiner* — Jared Fureman
*Assistant Examiner* — Duc M Pham
(74) *Attorney, Agent, or Firm* — McClure, Qualey & Rodack, LLP

(57) ABSTRACT

A power control circuit includes a detection unit, a first switch, a first control circuit, a second switch, and an energy storage unit. The detection unit provides a detection state according to a state of a bottom cover of an electronic device. The first switch generates a first control signal according to a control voltage corresponding to the detection state. The first control circuit is coupled to the first switch and controls, according to the first control signal, a first voltage source to provide an operating voltage to the first control circuit. The second switch generates a second control signal according to the control voltage. The energy storage unit is coupled to the first control circuit. The first control circuit generates a third control signal according to the second control signal, to control the energy storage unit to stop outputting a direct current power.

8 Claims, 4 Drawing Sheets

POWER CONTROL CIRCUIT AND POWER CONTROL METHOD

CROSS-REFERENCE TO RELATED APPLICATION

This application claims the priority benefit of TW application serial No. 106109590, filed on Mar. 22, 2017. The entirety of the above-mentioned patent application is hereby incorporated by references herein and made a part of specification.

BACKGROUND OF THE INVENTION

Field of the Invention

The present disclosure relates to a power control circuit and power control circuit method.

Description of the Related Art

With the development of science and technology, various electronic devices are increasing in popularity. However, if a user detaches a bottom cover from an electronic device to perform various operations on the electronic device (for example, replacing an internal element of the electronic device) when power is still supplied, the risk of damaging the electronic device is increased.

BRIEF SUMMARY OF THE INVENTION

Some implementations of the present disclosure relate to a power control circuit. The power control circuit includes: a detection unit, a first switch, a first control circuit, a second switch, and an energy storage unit. The detection unit provides a detection state according to a state of a bottom cover of an electronic device. The first switch is coupled to the detection unit and generates a first control signal according to a control voltage that corresponds to the detection state. The first control circuit is coupled to the first switch and controls, according to the first control signal, a first voltage source to provide an operating voltage to the first control circuit. The second switch is coupled to the detection unit and generates a second control signal according to the control voltage. The energy storage unit is coupled to the first control circuit. The first control circuit generates a third control signal according to the second control signal, to control the energy storage unit to stop outputting a direct current power.

Some implementations of the present disclosure relate to a power control method. The power control method includes: providing, by a detection unit, a detection state according to a state of a bottom cover of an electronic device; generating, by a first switch, a first control signal according to a control voltage that corresponds to the detection state; generating, by a second switch, a second control signal according to the control voltage; controlling, by a first control circuit according to the first control signal, a first voltage source to provide an operating voltage to the first control circuit; and generating, by the first control circuit, a third control signal according to the second control signal, to control an energy storage unit to stop outputting a DC power.

Based on the above, according to the power control circuit and method in the present disclosure, when the bottom cover of the electronic device is opened (for example, in an open state), the control circuit controls the energy storage unit to stop outputting the DC power. In this way, the risk of damaging the electronic device can be reduced.

DETAILED DESCRIPTION OF THE EMBODIMENTS

The "first", "second", "third" and the like used in the specification do not specially indicate an order or a sequence, and are not intended to limit the present disclosure. Rather, they are merely used for distinguishing elements or operations described by using same technical terms.

The word "coupled" used in the specification may be "electrically coupled", and the word "connected" may be "electrically connected". The "coupled" and the "connected" may alternatively be cooperation or interaction between two or more elements.

Figure 1:
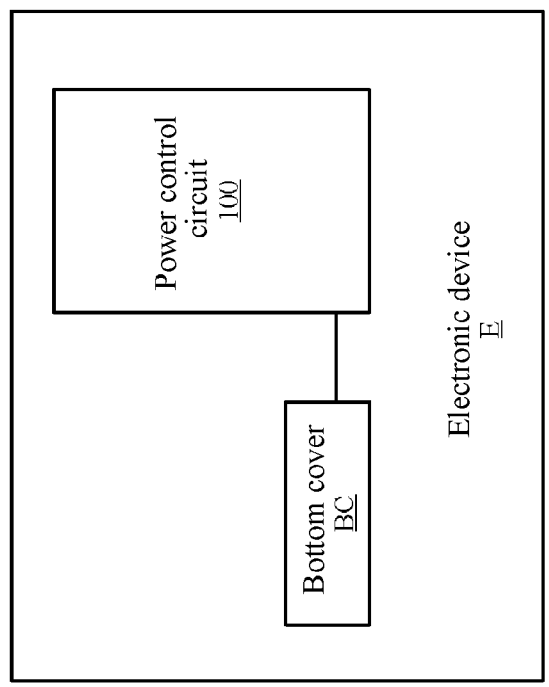
FIG. 1 is a schematic diagram of an electronic device according to an embodiment of the present disclosure.

Referring to FIG. 1, FIG. 1 is a schematic diagram of an electronic device E according to an embodiment of the present disclosure. In an embodiment, the electronic device E is a notebook computer, desktop, mobile device, but the present disclosure is not limited thereto.

In FIG. 1, the electronic device E includes a bottom cover BC and a power control circuit 100. The power control circuit 100 is configured to control a power source of the electronic device E according to a state (for example, open or closed) of the bottom cover BC. For ease of understanding, other elements of the electronic device E are not shown in FIG. 1. In an embodiment, the other elements of the electronic device E include a display panel, a keyboard, a central processing unit, and the like.

Figure 2:
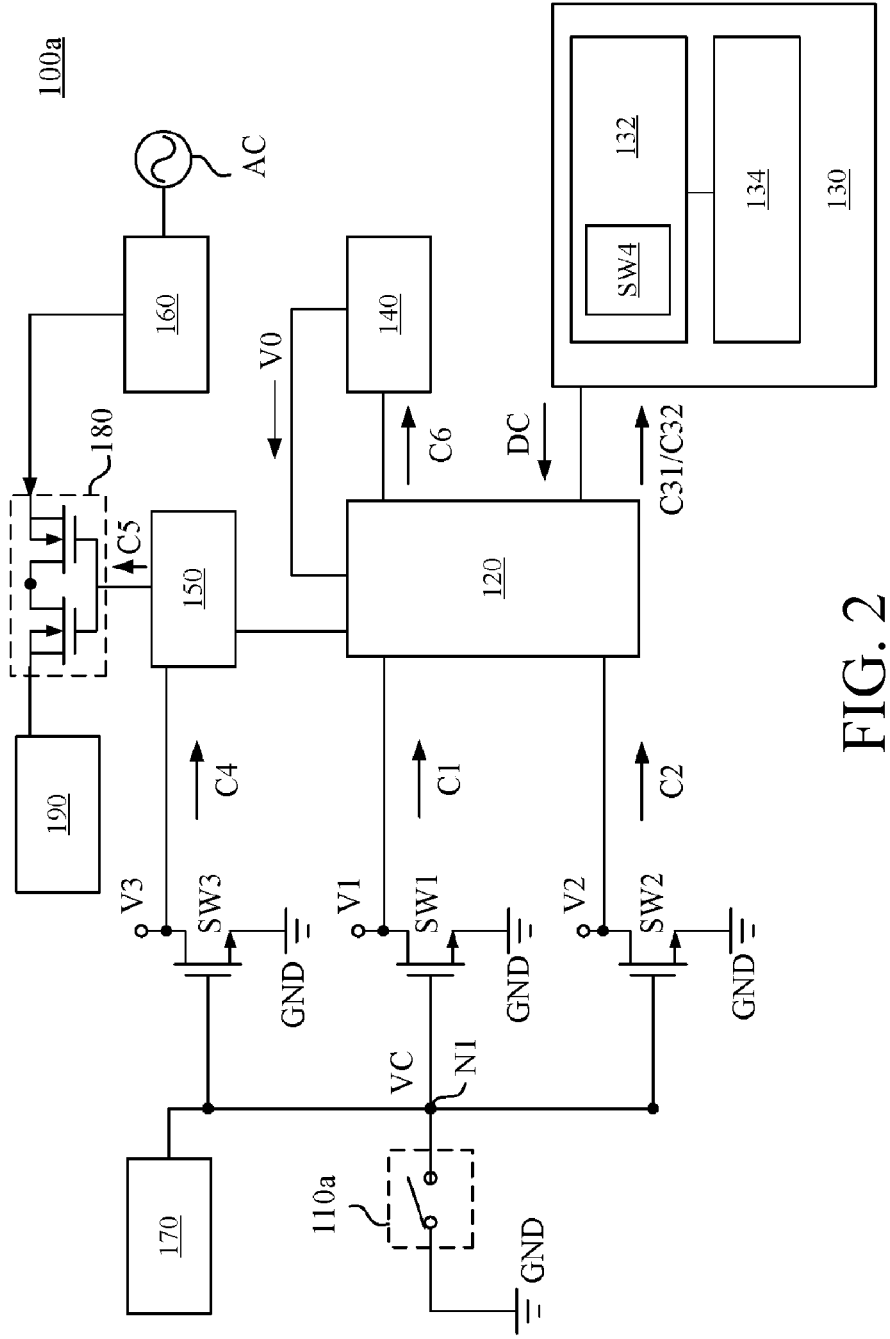
FIG. 2 is a circuit diagram of a power control circuit according to an embodiment of the present disclosure.

Referring to FIG. 2, FIG. 2 is a circuit diagram of a power control circuit 100a according to an embodiment of the present disclosure. In an embodiment, the power control circuit 100a in FIG. 2 is used for implementing the power control circuit 100 in FIG. 1.

In FIG. 2, the power control circuit 100a includes: a detection unit 110a, a first switch SW1, a second switch SW2, a control circuit 120, an energy storage unit 130, and a voltage source 140. In an embodiment, the power control circuit 100a further includes a third switch SW3 and a control circuit 150. In an embodiment, the power control circuit 100a further includes a voltage source 170. In an embodiment, the power control circuit 100a further includes a switch circuit 180 and a processing circuit 190.

As shown in FIG. 2, in an embodiment, the detection unit 110a is coupled between a ground terminal GND and a node N1. In an embodiment, the detection unit 110a is a dome switch, a button switch, a photoresistor switch, or a proximity sensitive switch, but the present disclosure is not limited thereto. In an embodiment, the detection unit 110a is disposed on a mainboard of an electronic device E.

The detection unit 110a is configured to provide a detection state (for example, off or on) according to a state of a bottom cover BC. In an embodiment, when the bottom cover BC of the electronic device E is in an open state, the detection unit 110a is in the off state. When the bottom cover BC of the electronic device E is in a closed state, the detection unit 110a is in the on state. In an embodiment, a control voltage VC at the node N1 corresponds to the detection state of the detection unit 110a. Details are described in the following paragraphs.

In an embodiment, the voltage source 170, the first switch SW1, the second switch SW2, and the third switch SW3 are coupled to the node N1.

In an embodiment, each of the first switch SW1, the second switch SW2, and the third switch SW3 is implemented by using a single N-type metal-oxide semiconductor field-effect transistor (MOSFET). The type of the transistor of each of the first switch SW1, the second switch SW2, and the third switch SW3 is not limited in the present disclosure. Various transistors by using which the switches can be implemented fall within the consideration scope of the present disclosure. In an embodiment, the transistors are bipolar junction transistors (BJT) or insulated gate bipolar transistors (IGBT).

In an embodiment, a gate of the first switch SW1 is coupled to the node N1. A source of the first switch SW1 is coupled to a ground terminal GND. A drain of the first switch SW1 is configured to receive a voltage V1 and is coupled to the control circuit 120. In an embodiment, a gate of the second switch SW2 is coupled to the node N1. A source of the second switch SW2 is coupled to a ground terminal GND. A drain of the second switch SW2 is configured to receive a voltage V2 and is coupled to the control circuit 120. In an embodiment, a gate of the third switch SW3 is coupled to the node N1. A source of the third switch SW3 is coupled to a ground terminal GND. A drain of the third switch SW3 is configured to receive a voltage V3 and is coupled to the control circuit 150.

In an embodiment, the control circuit 120 is coupled to the energy storage unit 130 and the voltage source 140. In an embodiment, the control circuit 120 is an embedded controller, but the present disclosure is not limited thereto. In an embodiment, the control circuit 120 is a control chip, a processor, or another hardware element having a control or processing function.

In an embodiment, the energy storage unit 130 includes: a processing element 132, a DC energy storage element 134, and a fourth switch SW4. The DC energy storage element 134 is coupled to the processing element 132. In an embodiment, the energy storage unit 130 is a battery pack. In an embodiment, the processing element 132 is a processing circuit or a processing chip. In an embodiment, the DC energy storage element 134 is a battery. In an embodiment, the processing element 132 includes the fourth switch SW4. In an embodiment, the fourth switch SW4 is coupled between the control circuit 120 and the processing element 132.

A type of a transistor of the fourth switch SW4 is not limited in the present disclosure. Various transistors by using which the fourth switch SW4 can be implemented fall within the consideration scope of the present disclosure.

In an embodiment, the switch circuit 180 is coupled to the control circuit 150 and the processing circuit 190. In an embodiment, the switch circuit 180 is configured to be coupled to the adapter 160. In an embodiment, the control circuit 150 is a charging control chip (charger IC). In an embodiment, the switch circuit 180 includes one or more switches. In an embodiment, the switch circuit 180 includes two N-type MOSFETs. In an embodiment, the processing circuit 190 is the mainboard of the electronic device E.

In an embodiment, when the state of the bottom cover BC is the open state, the detection unit 110a is in the off state. The voltage source 170 outputs a voltage (for example, 3 volts) to the node N1, so that the control voltage VC at the node N1 is a high voltage (logical value "1").

In an embodiment, the first switch SW1, the second switch SW2, and the third switch SW3 are turned on or turned off according to the control voltage VC at the node N1. Because the first switch SW1, the second switch SW2, and the third switch SW3 are N-type MOSFETs and the control voltage VC corresponds to the logical value "1", all of the first switch SW1, the second switch SW2, and the third switch SW3 are turned on.

When the first switch SW1 is turned on, the drain of the first switch SW1 is grounded, so that a control signal C1 having a logical value "0" is generated. When the second switch SW2 is turned on, the drain of the second switch SW2 is grounded, so that a control signal C2 having the logical value "0" is generated. When the third switch SW3 is turned on, the drain of the third switch SW3 is grounded, so that a control signal C4 having the logical value "0" is generated. In this way, all of the control signal C1, the control signal C2, and the control signal C4 correspond to the logical value "0".

In an embodiment, when the control circuit 120 receives the control signal C1 having the logical value "0", the control circuit 120 generates a control signal C6 having the logical value "1". The voltage source 140 provides an operating voltage V0 to the control circuit 120 according to the control signal C6 having the logical value "1", to awaken the control circuit 120. In an embodiment, the electronic device E is powered off before the bottom cover BC is to be opened. In this case, the control circuit 120 is in sleep mode. The voltage source 140 provides the operating voltage V0 to the control circuit 120, so that the control circuit 120 in sleep mode is awakened.

In an embodiment, after the control circuit 120 receives the control signal C2 having the logical value "0", the control circuit 120 generates a control signal C31, to control the energy storage unit 130 to stop outputting a direct current power DC to the control circuit 120. In an embodiment, the control signal C31 is a power-off command. In an embodiment, the control signal C31 is transmitted to the energy storage unit 130 by using a bus. In an embodiment, the processing element 132 receives the control signal C31, and controls, according to the control signal C31, the fourth switch SW4 to be turned off. In this way, the DC energy storage element 134 cannot transmit the direct current power DC to the control circuit 120 by using the fourth switch SW4.

In an embodiment, there is a battery connector between the processing element 132 and the DC energy storage element 134. When the processing element 132 turns off the fourth switch SW4 according to the control signal C31, a voltage of the battery connector is pulled down. The voltage of the battery connector is compared with a critical voltage. In an embodiment, assuming that the critical voltage is 3 volts, when the voltage of the battery connector is less than 3 volts, it is determined that a DC power-off program is completed. In an embodiment, when the voltage of the battery connector is greater than 3 volts, it is determined that a DC power-off program fails, and the processing element 132 turns on the fourth switch SW4.

According to the configuration in the power control circuit 100a, when the bottom cover BC is opened, the direct current power DC is cut. In an embodiment, the control circuit 150 generates a control signal C5 having the logical value "0" according to the control signal C4 having the logical value "0". The switch in the switch circuit 180 is turned off according to the control signal C5 having the logical value "0". In this way, an alternating current power AC cannot be transmitted to the processing circuit 190 by using the switch circuit 180. Therefore, according to the configuration in the power control circuit 100a, when the bottom cover BC is opened, the alternating current power AC is cut.

In an embodiment, according to the configuration in the power control circuit 100a, when the bottom cover BC is opened, both the direct current power DC and the alternating current power AC are cut.

In an embodiment, the logical value of the control signal C5 is adjusted according to the type of the switch in the switch circuit 180. In an embodiment, if the switch in the switch circuit 180 is implemented by using a P-type MOSFET, the control circuit 150 generates a control signal C5 having the logical value "1" according to the control signal C4 having the logical value "0".

In an embodiment, when the state of the bottom cover BC is the closed state, the detection unit 110a is in the on state. In this case, a ground voltage of the ground terminal GND is transmitted to the node N1 by using the detection unit 110a, so that the control voltage VC at the node N1 is the ground voltage (logical value 0). In another word, the level of the control voltage VC is pulled down by using the detection unit 110a. Because the first switch SW1, the second switch SW2, and the third switch SW3 are N-type MOSFETs and the control voltage VC corresponds to the logical value "0", all of the first switch SW1, the second switch SW2, and the third switch SW3 are turned off.

When the first switch SW1 is turned off, the drain of the first switch SW1 transmits the voltage V1 to the control circuit 120, to generate a control signal C1 having the logical value "1". When the second switch SW2 is turned off, the drain of the second switch SW2 transmits the voltage V2 to the control circuit 120, to generate a control signal C2 having the logical value "1". When the third switch SW3 is turned off, the drain of the third switch SW3 transmits the voltage V3 to the control circuit 150, to generate a control signal C4 having the logical value "1".

In an embodiment, the control circuit 120 generates a control signal C32 according to the control signal C2 having the logical value "1", to control the energy storage unit 130 to provide the direct current power DC to the control circuit 120. In an embodiment, the control signal C32 is a power supply command. In an embodiment, the control signal C32 is transmitted to the energy storage unit 130 by using a bus. In an embodiment, the processing element 132 receives the control signal C32, and controls, according to the control signal C32, the fourth switch SW4 to be turned on. In this way, the fourth switch SW4 can transmit the direct current power DC from the DC energy storage element 134 to the control circuit 120.

In an embodiment, the control circuit 150 generates a control signal C5 having the logical value "1" according to the control signal C4 having the logical value "1". The switch in the switch circuit 180 is turned on according to the control signal C5 having the logical value "1". In this way, the alternating current power AC can be provided to the processing circuit 190 by using the adapter 160 and the switch circuit 180.

Figure 3:
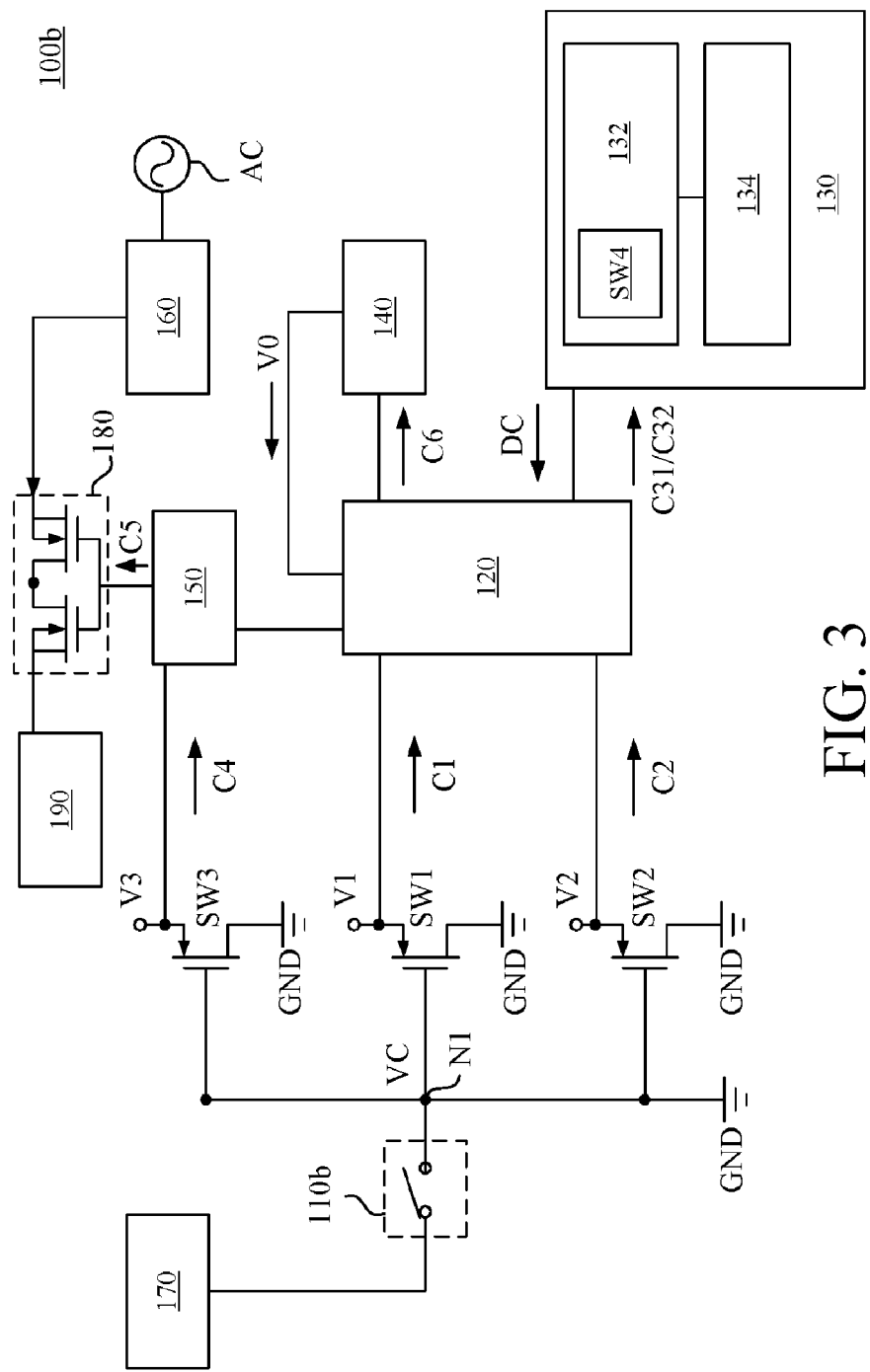
FIG. 3 is a circuit diagram of a power control circuit according to an embodiment of the present disclosure.

Referring to FIG. 3, FIG. 3 is a circuit diagram of a power control circuit 100b according to an embodiment of the present disclosure. In an embodiment, the power control circuit 100b in FIG. 3 is used for implementing the power control circuit 100 in FIG. 1. For ease of understanding, same reference numbers are used in FIG. 3 for representing elements similar to the elements in FIG. 2.

The following mainly describes differences between the power control circuit 100b in FIG. 3 and the power control circuit 100a in FIG. 2.

As shown in FIG. 3, in an embodiment, a detection unit 110b is coupled between a voltage source 170 and a node N1. A first switch SW1, a second switch SW2, a third switch SW3, and a ground terminal GND are coupled to the node N1.

In an embodiment, each of the first switch SW1, the second switch SW2, and the third switch SW3 is implemented by using a single P-type MOSFET. In an embodiment, a gate of the first switch SW1 is coupled to the node N1. A drain of the first switch SW1 is coupled to a ground terminal GND. A source of the first switch SW1 is configured to receive a voltage V1 and is coupled to a control circuit 120. In an embodiment, a gate of the second switch SW2 is coupled to the node N1. A drain of the second switch SW2 is coupled to a ground terminal GND. A source of the second switch SW2 is configured to receive a voltage V2 and is coupled to the control circuit 120. In an embodiment, a gate of the third switch SW3 is coupled to the node N1. A drain of the third switch SW3 is coupled to a ground terminal GND. A source of the third switch SW3 is configured to receive a voltage V3 and is coupled to a control circuit 150.

In an embodiment, when a bottom cover BC of an electronic device E is opened, the detection unit 110b is off. The node N1 is grounded (logical value "0"). Because the first switch SW1, the second switch SW2, and the third switch SW3 are P-type MOSFETs and the control voltage VC corresponds to the logical value "0", all of the first switch SW1, the second switch SW2, and the third switch SW3 are turned on.

When the first switch SW1 is turned on, the source of the first switch SW1 is grounded, so that a control signal C1 having the logical value 0 is generated. When the second switch SW2 is turned on, the source of the second switch SW2 is grounded, so that a control signal C2 having the logical value 0 is generated. When the third switch SW3 is turned on, the source of the third switch SW3 is grounded, so that a control signal C4 having the logical value "0" is generated.

In an embodiment, when the bottom cover BC is in a closed state, the detection unit 110b is on. A voltage output from the voltage source 170 (for example, 3 volts) is transmitted to the node N1 by using the detection unit 110b. Therefore, the control voltage VC at the node N1 is a high voltage (logical value "1"). Because the first switch SW1, the second switch SW2, and the third switch SW3 are P-type MOSFETs and the control voltage VC corresponds to the logical value "1", all of the first switch SW1, the second switch SW2, and the third switch SW3 are turned off.

When the first switch SW1 is turned off, the drain of the first switch SW1 transmits the voltage V1 to the control circuit 120, to generate a control signal C1 having the logical value "1". When the second switch SW2 is turned off, the drain of the second switch SW2 transmits the voltage V2 to the control circuit 120, to generate a control signal C2 having the logical value "1". When the third switch SW3 is turned off, the drain of the third switch SW3 transmits the voltage V3 to the control circuit 150, to generate a control signal C4 having the logical value "1".

For the remaining part of the power control circuit 100b, refer to the related embodiments of the power control circuit 100a, and details are not described herein again.

Figure 4:
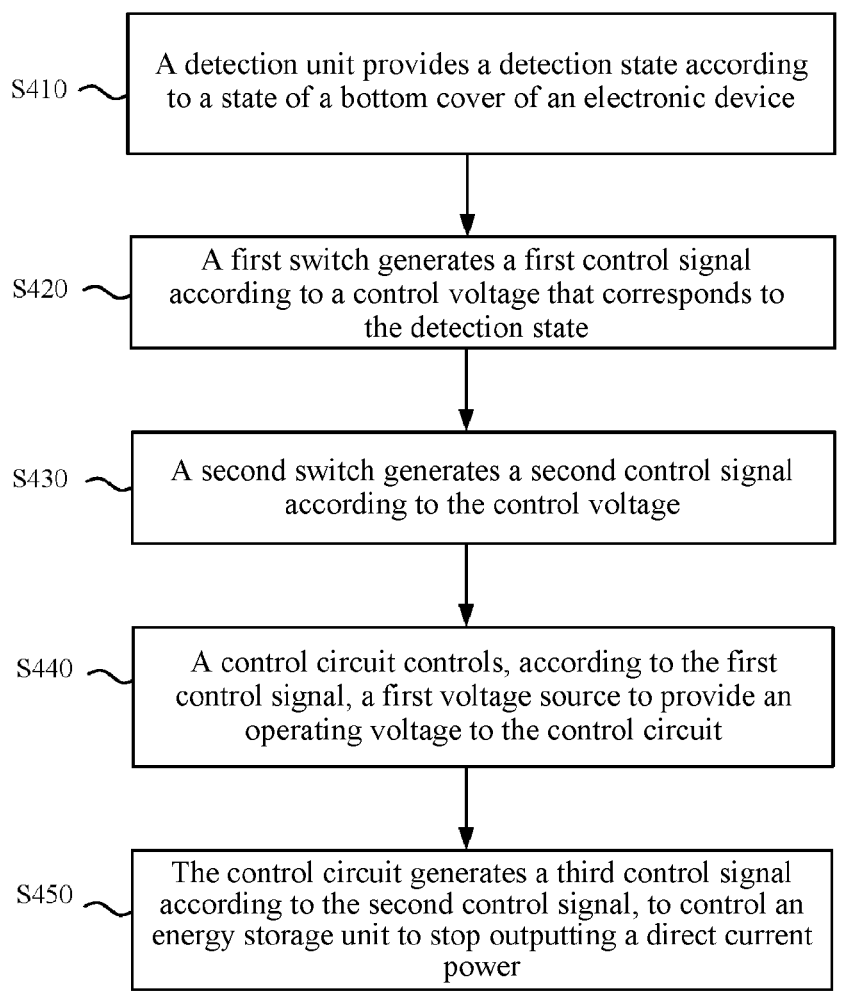
FIG. 4 is a flowchart of a power control method according to an embodiment of the present disclosure.

FIG. 4 is a flowchart of a power control method 400 according to an embodiment of the present disclosure. To understand the present disclosure in a better manner, the power control method 400 is described with reference to the power control circuit 100a in FIG. 2. However, the present disclosure is not limited thereto.

In an embodiment, the power control method 400 includes: step S410, step S420, step S430, step S440, and step S450.

In step S410, a detection unit 110a provides a detection state (for example, off or on) according to a state of a bottom cover BC of an electronic device E. In an embodiment, when the bottom cover BC of the electronic device E is in an open state, the detection unit 110a is in the off state. When the bottom cover BC of the electronic device E is in a closed state, the detection unit 110a is in the on state. In an embodiment, a control voltage VC at a node N1 corresponds to the detection state of the detection unit 110a. In an embodiment, when the detection unit 110a is in the off state, a voltage provided by a voltage source 170 causes the control voltage VC at the node N1 to correspond to a logical value "1".

In step S420, a first switch SW1 generates a control signal C1 according to the control voltage VC that corresponds to the detection state. In an embodiment, because the first switch SW1 is an N-type MOSFET and the control voltage VC corresponds to the logical value "1", the first switch SW1 is turned on. When the first switch SW1 is turned on, a source of the first switch SW1 is grounded, so that a control signal C1 having a logical value "0" is generated.

In step S430, a second switch SW2 generates a control signal C2 according to the control voltage VC. In an embodiment, because the second switch SW2 is an N-type MOSFET and the control voltage VC corresponds to the logical value "1", the second switch SW2 is turned on. When the second switch SW2 is turned on, a source of the second switch SW2 is grounded, so that a control signal C2 having the logical value "0" is generated.

In step S440, a control circuit 120 controls, according to the control signal C1, a voltage source 140 to provide an operating voltage V0 to the control circuit 120. In an embodiment, when the control circuit 120 receives the control signal C1 having the logical value "0", the control circuit 120 generates a control signal C6 having the logical value "1". Then, the voltage source 140 provides the operating voltage V0 to the control circuit 120 according to the control signal C6 having the logical value "1", to awaken the control circuit 120.

In step S450, the control circuit 120 generates a control signal C31 according to the control signal C2, to control an energy storage unit 130 to stop outputting a direct current power DC. In an embodiment, after the control circuit 120 receives the control signal C2 having the logical value "0", the control circuit 120 generates the control signal C31. In an embodiment, the control signal C31 is a power-off command. Then, the energy storage unit 130 stops, according to the control signal C31, outputting the direct current power DC to the control circuit 120.

Although the present disclosure has been disclosed by using the implementations, the implementations are not intended to limit the present disclosure, and a person of ordinary skill in the art may make various modifications and improvements without departing from the spirit and scope of the present disclosure. Therefore, the protection scope of the present disclosure should be subject to the scope defined by the appended claims.

What is claimed is:

1. A power control circuit, comprising:
a detection unit providing a detection state according to a state of a bottom cover of an electronic device;
a first switch coupled to the detection unit, the first switch generating a first control signal according to a control voltage that corresponds to the detection state;
a first control circuit coupled to the first switch and controlling, according to the first control signal, a first voltage source to provide an operating voltage to the first control circuit;
a second switch coupled to the detection unit, the second switch generating a second control signal according to the control voltage;
an energy storage unit coupled to the first control circuit, the first control circuit generating a third control signal according to the second control signal, to control the energy storage unit to stop outputting a direct current power;
a third switch coupled to the detection unit, the third switch being configured to generate a fourth control signal according to the control voltage;
a switch circuit coupled to a processing circuit and an adapter; and
a second control circuit coupled to the third switch and the switch circuit, the second control circuit being configured to output a fifth control signal according to the fourth control signal, to turn off the switch circuit, to control the adapter to stop providing an alternating current power to the processing circuit.

2. The power control circuit according to claim 1, wherein the energy storage unit further comprises:
a fourth switch;
a DC energy storage element coupled to the fourth switch; and
a processing element coupled to the first control circuit, the processing element being configured to turn off the fourth switch according to the third control signal, so that the DC energy storage element stops outputting DC power to the first control circuit.

3. The power control circuit according to claim 1, wherein the first control circuit is further configured to generate a sixth control signal according to the first control signal, and the first voltage source is configured to provide the operating voltage to the first control circuit according to the sixth control signal and awaken the first control circuit.

4. The power control circuit according to claim 1, wherein a second voltage source is coupled between the detection unit and the first switch and the second switch.

5. The power control circuit according to claim 1, wherein the detection unit is coupled between a second voltage source and the first switch and the second switch.

6. A power control method, comprising:
providing, by a detection unit, a detection state according to a state of a bottom cover of an electronic device;
generating, by a first switch, a first control signal according to a control voltage that corresponds to the detection state;
generating, by a second switch, a second control signal according to the control voltage;
controlling, by a first control circuit according to the first control signal, a first voltage source to provide an operating voltage to the first control circuit;

generating, by the first control circuit, a third control signal according to the second control signal, to control an energy storage unit to stop outputting a direct current power;

generating, by a third switch, a fourth control signal according to the control voltage; and generating, by a second control circuit, a fifth control signal according to the fourth control signal, to turn off a switch circuit, to control an adapter to stop providing an alternating current power to a processing circuit.

7. The power control method according to claim 6, wherein the generating, by the first control circuit, a third control signal according to the second control signal, to control an energy storage unit to stop outputting a DC power comprises:

generating, by the first control circuit, the third control signal according to the second control signal; and turning off, by a processing element in the energy storage unit, a fourth switch in the energy storage unit according to the third control signal, so that a DC energy storage element in the energy storage unit stops outputting the DC power.

8. The power control method according to claim 6, wherein the controlling, by a first control circuit according to the first control signal, a first voltage source to provide an operating voltage to the first control circuit comprises:

generating, by the first control circuit, a sixth control signal according to the first control signal; and providing, by the first voltage source, the operating voltage to the first control circuit according to the sixth control signal.

* * * * *